United States Patent
Han et al.

(10) Patent No.: US 11,775,715 B2
(45) Date of Patent: Oct. 3, 2023

(54) SYSTEM-ON-CHIP AUTOMATIC DESIGN DEVICE AND OPERATION METHOD THEREOF

(71) Applicant: Electronics and Telecommunications Research Institute, Daejeon (KR)

(72) Inventors: Kyuseung Han, Daejeon (KR); Sukho Lee, Daejeon (KR); Jae-Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 481 days.

(21) Appl. No.: 17/116,637

(22) Filed: Dec. 9, 2020

(65) Prior Publication Data

US 2021/0182462 A1 Jun. 17, 2021

(30) Foreign Application Priority Data

Dec. 16, 2019 (KR) .................. 10-2019-0167852

(51) Int. Cl.
*G06F 30/331* (2020.01)
*G06F 30/32* (2020.01)
(Continued)

(52) U.S. Cl.
CPC ............ *G06F 30/331* (2020.01); *G06F 13/12* (2013.01); *G06F 30/32* (2020.01); *G06F 30/323* (2020.01);
(Continued)

(58) Field of Classification Search
CPC .... G06F 30/331; G06F 30/327; G06F 30/323; G06F 30/32; G06F 13/12; G06F 2213/0038; G06F 2213/3808
(Continued)

(56) References Cited

U.S. PATENT DOCUMENTS 6,634,008 B1 10/2003 Dole
7,904,872 B2 3/2011 Ebbers et al.
(Continued)

FOREIGN PATENT DOCUMENTS

JP 2001-5858 A 1/2001
KR 10-0492721 6/2005
(Continued)

*Primary Examiner* — Phallaka Kik
(74) *Attorney, Agent, or Firm* — KILE PARK REED & HOUTTEMAN PLLC

(57) ABSTRACT

Disclosed is a method of operating a system-on-chip automatic design device. The system-on-chip automatic design device includes a first synthesizer and a second synthesizer. The method includes generating a first code, based on information of a first signal and information of a second signal that are used in a first IP (Intellectual Property) block, classifying a first signal code corresponding to the first signal and a second signal code corresponding to the second signal from the first code, synthesizing, through the first synthesizer, a first communication architecture configured to transmit the first signal, based on the classified first signal code, and synthesizing, through the second synthesizer, a second communication architecture configured to transmit the second signal based on the classified second signal code.

12 Claims, 10 Drawing Sheets

(51) Int. Cl.
*G06F 30/327* (2020.01)
*G06F 30/323* (2020.01)
*G06F 13/12* (2006.01)

(52) U.S. Cl.
CPC .... *G06F 30/327* (2020.01); *G06F 2213/0038* (2013.01); *G06F 2213/3808* (2013.01)

(58) Field of Classification Search
USPC .................... 716/101, 103, 104, 138; 703/14
See application file for complete search history.

(56) References Cited

U.S. PATENT DOCUMENTS

| | | |
|---|---|---|
| 2009/0138645 A1 | 5/2009 | Chun et al. |
| 2010/0218146 A1 | 8/2010 | Platzker et al. |
| 2012/0059548 A1* | 3/2012 | Agrawal ............... A61F 5/0102 701/1 |
| 2012/0214416 A1* | 8/2012 | Kent .................... H04W 4/021 455/41.2 |
| 2015/0149843 A1* | 5/2015 | Finan ............. G01R 31/318519 714/726 |
| 2015/0339424 A1 | 11/2015 | Chang |
| 2019/0180041 A1 | 6/2019 | Bhunia et al. |
| 2019/0286606 A1 | 9/2019 | Han et al. |

FOREIGN PATENT DOCUMENTS

| | | |
|---|---|---|
| KR | 10-0714073 B1 | 5/2007 |
| KR | 10-2011-0015416 | 2/2011 |
| KR | 2015-0134688 | 12/2015 |

\* cited by examiner

SYSTEM-ON-CHIP AUTOMATIC DESIGN DEVICE AND OPERATION METHOD THEREOF

CROSS-REFERENCE TO RELATED APPLICATIONS

This application claims priority under 35 U.S.C. § 119 to Korean Patent Application No. 10-2019-0167852 filed on Dec. 16, 2019, in the Korean Intellectual Property Office, the disclosures of which are incorporated by reference herein in their entireties.

BACKGROUND

Embodiments of the present disclosure described herein relate to a system-on-chip automatic design device and operation method thereof, and more particularly, relate to a system-on-chip automatic design device in which connection between IPs (Intellectual Properties) is automatically implemented, and an operation method thereof.

In recent years, the number of hardware modules (e.g., the IPs) integrated on a system-on-chip (SoC) is rapidly increasing. Therefore, importance of a communication architecture connecting the hardware modules is increasing. For example, the communication architecture may include a simple connection, a broadcaster, a bus, and a Network-on-Chip (NoC).

Meanwhile, as the number of hardware modules included in the system-on-chip increases, types of communication and signals connecting the hardware modules are increasing, and the burden of managing various communication and signals is increasing. Since mistakes or errors occurring while connecting the hardware modules may cause inoperability or malfunction of the entire system-on-chip, a method of correctly connecting the hardware modules without mistakes is required.

SUMMARY

Embodiments of the present disclosure provide a system-on-chip automatic design device in which connection between IPs is automatically implemented, and an operation method thereof.

According to an embodiment of the present disclosure, a method of operating a system-on-chip automatic design device including a first synthesizer and a second synthesizer includes generating a first code, based on information of a first signal and information of a second signal that are used in a first IP (Intellectual Property) block, classifying a first signal code corresponding to the first signal and a second signal code corresponding to the second signal from the first code, synthesizing, through the first synthesizer, a first communication architecture configured to transmit the first signal based on the classified first signal code, and synthesizing, through the second synthesizer, a second communication architecture configured to transmit the second signal based on the classified second signal code.

According to an embodiment, the information of the first signal may include first type information, and the information of the second signal may include second type information, and the classifying of the first signal code and the second signal code from the first code may include classifying the first signal code from the first code, based on the first type information, and classifying the second signal code from the first code, based on the second type information.

According to an embodiment, the generating of the first code may include generating the first code, based on the information of the first signal, the information of the second signal, and information of a third signal that are used in the first IP block, and the classifying of the first signal code and the second signal code from the first code may include classifying the first signal code and a third signal code corresponding to the third signal from the first code, based on the first type information, and the information of the third signal may include the first type information.

According to an embodiment, the method may further include synthesizing a third communication architecture configured to transmit the third signal, based on the classified third signal code through the first synthesizer.

According to an embodiment, the method may further include generating a second code, based on information of a fourth signal that is used in a second IP block, and classifying a fourth signal code corresponding to the fourth signal from the second code, and the information of the fourth signal may include the first type information.

According to an embodiment, the synthesizing of the first communication architecture may include synthesizing the first communication architecture configured to transmit the first signal, based on the classified first signal code and to transmit the fourth signal, based on the classified fourth signal code through the first synthesizer.

According to an embodiment, the method may further include connecting the first IP block and the second IP block through the synthesized first communication architecture.

According to an embodiment, the first type information may include clock information, the first signal may be a clock transmission signal, and the fourth signal may be a clock reception signal.

According to an embodiment, the first type information may include data transmission/reception information, and the first communication architecture may be a network-on-chip, based on an advanced extensible interface (AXI) protocol.

According to an embodiment of the present disclosure, a system-on-chip design device includes an IP library that stores information of a first signal and information of a second signal that are used in a first IP (Intellectual Property) block, a code generator that generates a first code, based on the information of the first signal and the information of the second signal stored in the IP library, a signal classifier that classifies a first signal code corresponding to the first signal and a second signal code corresponding to the second signal from the first code, a first synthesizer that synthesizes a first communication architecture that transmits the first signal, based on the classified first signal code, and a second synthesizer that synthesizes a second communication architecture that transmits the second signal, based on the classified second signal code.

According to an embodiment, the signal classifier may be further configured to classify the first signal code from the first code, based on first type information and to classify the second signal code from the first code, based on second type information, and the information of the first signal may include the first type information, and the information of the second signal may include the second type information.

According to an embodiment, the IP library may be further configured to store information of a third signal that is used in a second IP block and includes the first type information, the code generator may be further configured to generate a second code, based on the information of the third signal stored in the IP library, the signal classifier may be further configured to classify a third signal code corresponding to the third signal from the second code, and the first synthesizer may be further configured to synthesize the first communication architecture that transmits the first signal, based on the classified first signal code and transmits the third signal, based on the classified third signal code.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
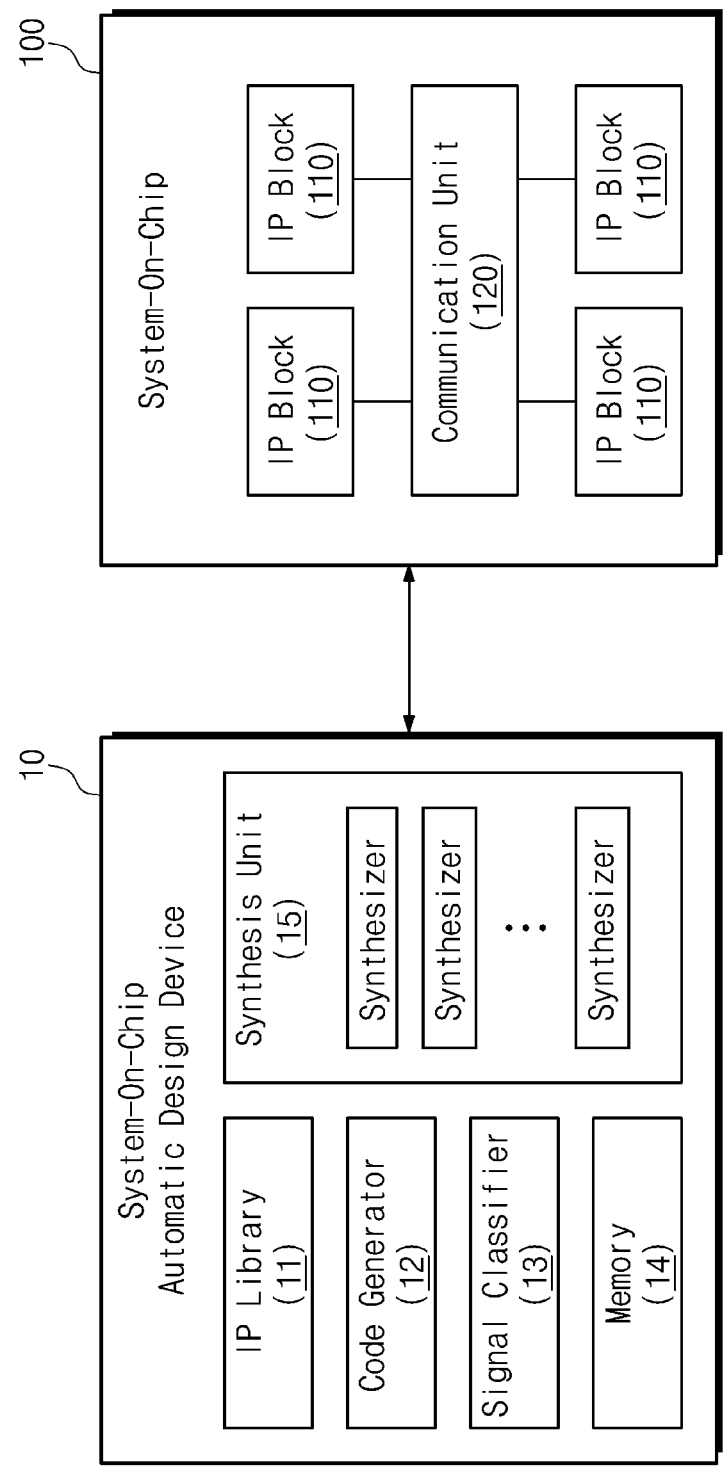
FIG. 1 is a diagram illustrating a system-on-chip automatic design device according to an embodiment of the present disclosure.

Hereinafter, embodiments of the present disclosure will be described clearly and in detail such that those skilled in the art may easily carry out the present disclosure.

Terms such as "unit" and "module" used below, or functional blocks illustrated in the drawings may be implemented in the form of a software configuration, a hardware configuration, or a combination thereof. Hereinafter, to clearly describe the technical idea of the present disclosure, detailed descriptions of redundant components will be omitted.

FIG. 1 is a diagram illustrating a system-on-chip automatic design device according to an embodiment of the present disclosure. Referring to FIG. 1, a system-on-chip automatic design device 10 and a system-on-chip 100 are illustrated.

The system-on-chip 100 may refer to a system-on-chip (SoC) in which circuits that perform various functions are integrated on one chip. The system-on-chip 100 may include a plurality of IP (Intellectual Property) blocks 110. The IP block 110 may mean a circuit designed to perform a specific function or a plurality of functions. The IP block 110 is also referred to as an Intellectual Property, an IP core, or an IP chip. For example, the IP block 110 may be a circuit such as a processor core, a direct memory access (DMA) module, a static random access memory (SRAM), and an interrupt controller.

The system-on-chip 100 may include a communication unit 120. The communication unit 120 may include a module or a circuit connecting the IP blocks 110. For example, the communication unit 120 may include a module or a circuit that connects the IP blocks 110 such as a wire, a broadcaster transmitting data, a bus, and a network-on-chip (NoC).

The system-on-chip automatic design device 10 may be a device that designs the system-on-chip 100. For example, the system-on-chip automatic design device 10 may be a module that controls a manufacturing apparatus of the system-on-chip 100 or a module that generates design information of the system-on-chip 100. In an embodiment, the system-on-chip automatic design device 10 may be implemented based on software.

The system-on-chip automatic design device 10 may include an IP library 11, a code generator 12, a signal classifier 13, a memory 14, and a synthesis unit 15. The IP library 11 may store modeling information of each of the IP blocks 110 in the form of a library. The modeling information of the IP block 110 may include information on signals used in the IP block 110.

For example, the IP library 11 may store input/output information of a port included in the IP block 110, a communication method of a signal used in the IP block 110, type information of signals used, etc. The type information may include information on a communication content of the signals. For example, the type information may include information indicating that the type of a signal used in a specific port of a specific DMA module is a clock type corresponding to a clock signal.

The code generator 12 may create a code describing a connection relationship of the IP block 110, based on information stored in the IP library 11. For example, the code generator 12 may be a device or a module that generates a Verilog Register Transfer Level (RTL) code describing a wire, a bus, or a network-on-chip connected to the port of the IP block 110.

The signal classifier 13 may classify codes generated by the code generator 12. In an embodiment, the codes generated by the code generator 12 may include a code corresponding to a first signal used in a first port of the specific IP block 110 and a code corresponding to the second signal used in a second port of the specific IP block 110. The signal classifier 13 may classify the code corresponding to the first signal and the code corresponding to the second signal in the codes generated by the code generator 12.

In an embodiment, the signal classifier 13 may classify the codes, based on type information of a signal. For example, the signal classifier 13 may classify a code having type information corresponding to a clock signal and a code having type information corresponding to a reset signal from the codes of the DMA module generated by the code generator 12.

The memory 14 may be a memory that stores information required for the operation of the system-on-chip automatic design device 10. In an embodiment, the memory 14 may be a read-only memory (ROM) including information on a synthesizer corresponding to type information of a signal used in the IP block 110. For example, the memory 14 may include information indicating that a clock type signal corresponds to a clock synthesizer.

The synthesis unit 15 may include a plurality of synthesizers. The synthesizer may be a device configured to synthesize at least a part of the communication unit 120. In more detail, the synthesizer may be a device that synthesizes hardware that connects the IP blocks 110 in the communication unit 120. For example, the synthesizer may synthesize a wire that transmits a clock signal generated in the first IP block to the second IP block.

As described above, according to an embodiment of the present disclosure, by generating the codes, based on the information of the IP block 110 stored in the IP library 11, classifying the generated codes, and synthesizing the communication unit 120 through synthesizers corresponding to each of the classified codes, the system-on-chip automatic design device 10 that automatically designs the system-on-chip 100 may be provided.

Figure 2:
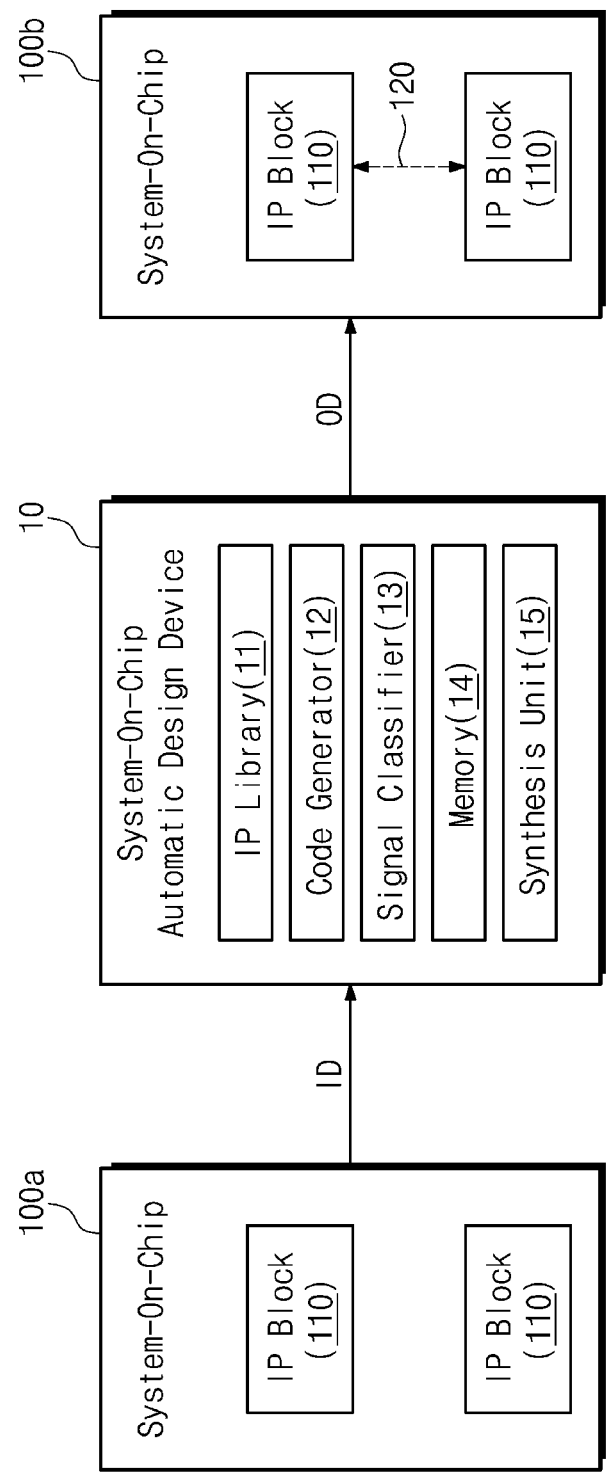
FIG. 2 is a diagram describing an operation of a system-on-chip automatic design device of FIG. 1.

FIG. 2 is a diagram describing an operation of a system-on-chip automatic design device of FIG. 1. Referring to FIG. 2, the operation of the system-on-chip automatic design device 10 will be described by way of example. The system-on-chip automatic design device 10 may generate output information OD corresponding to a system-on-chip 100*b*, based on input information ID corresponding to a system-on-chip 100*a*.

The system-on-chip 100*a* may be a system-on-chip to which the IP blocks 110 are not connected. The system-on-chip 100*b* may be a system-on-chip to which the IP blocks 110 are connected through the communication unit 120. That is, the system-on-chip automatic design device 10 may be a device that synthesizes the communication unit 120 connecting the IP blocks 110.

In an embodiment, the system-on-chip automatic design device 10 may receive the input information ID including information corresponding to a connection relationship among the IP blocks 110. For example, the input information ID may be information that a user of the system-on-chip automatic design device 10 designs the connection relationship among the IP blocks 110.

According to an embodiment of the present disclosure, the system-on-chip automatic design device 10 may generate the codes, based on the input information ID and modeling information of the IP blocks 110 stored in the IP library 11. The system-on-chip automatic design device 10 may classify each of the codes, based on the type information. The system-on-chip automatic design device 10 may synthesize the communication unit 120 through the synthesizer corresponding to a code classified based on the type information. The system-on-chip automatic design device 10 may generate the output information OD corresponding to the system-on-chip 100*b* including the communication unit 120.

Figure 3:
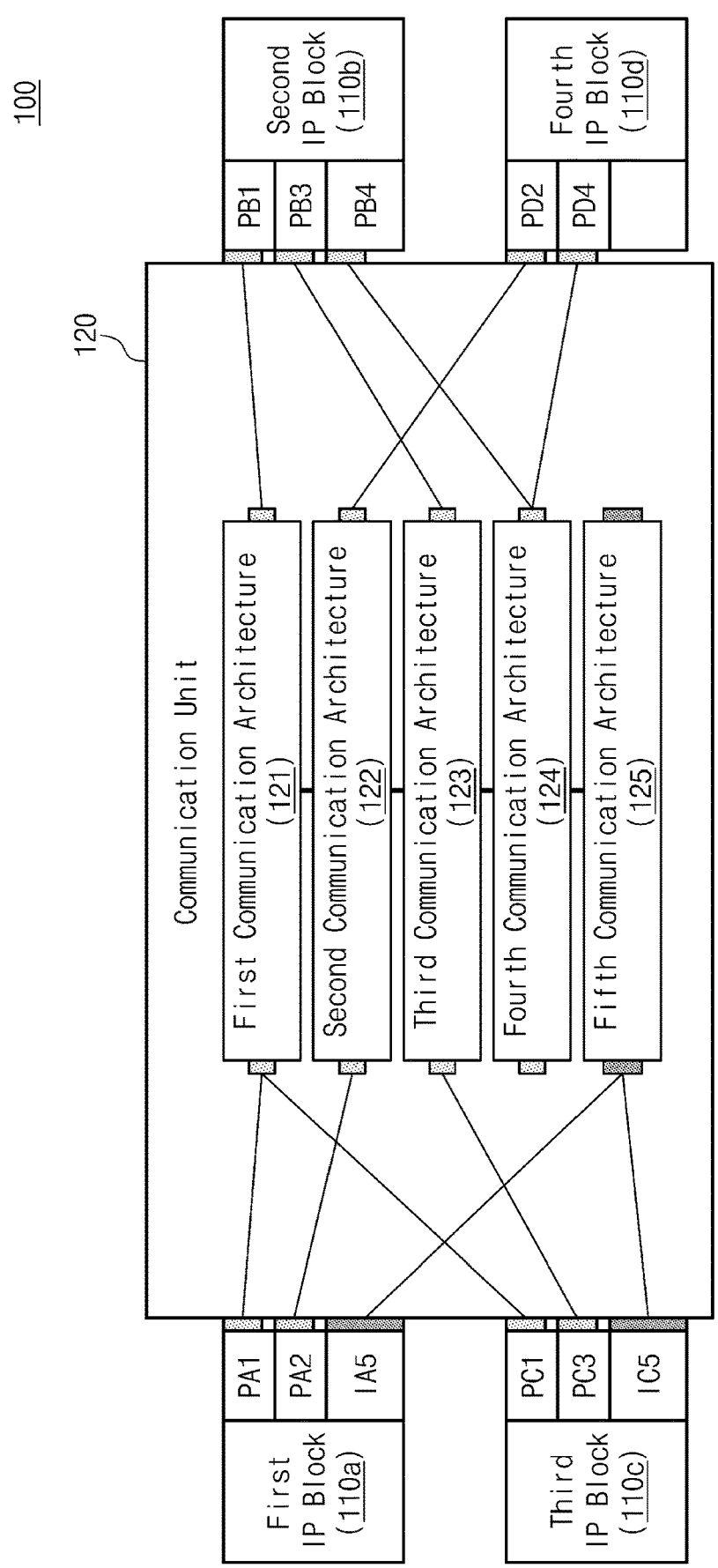
FIG. 3 is a diagram illustrating a communication unit synthesized by a system-on-chip automatic design device of FIG. 1.

FIG. 3 is a diagram illustrating the communication unit 120 synthesized by a system-on-chip automatic design device of FIG. 1. Referring to FIG. 3, the communication unit 120 synthesized by a system-on-chip automatic design device is illustrated as an example. The communication unit 120 may connect first to fourth IP blocks 110*a* to 110*d*. The communication unit 120 is illustrated to connect four IP blocks, but the scope of the present disclosure is not limited thereto, and the number of IP blocks connected by the communication unit 120 may increase or decrease.

According to an embodiment of the present disclosure, the IP block may include a port or an interface. The port may be a terminal configured to transmit a signal. The interface may be a terminal configured to transmit a plurality of signals. The signals transmitted through the interface may be signals having the same type information. For example, the signals transmitted through the interface may be memory type signals corresponding to data transmission.

The first IP block 110*a* may include a port PA1, a port PA2, and an interface IA5. The port PA1 may be a terminal configured to transmit a signal having first type information. The port PA2 may be a terminal configured to transmit a signal having second type information. The interface IA5 may be a terminal configured to transmit signals having fifth type information.

The second IP block 110*b* may include a port PB1, a port PB3, and a port PB4. The port PB1 may be a terminal configured to transmit a signal having the first type information. The port PB3 may be a terminal configured to transmit a signal having third type information. The port PB4 may be a terminal configured to transmit a signal having fourth type information.

The third IP block 110*c* may include a port PC1, a port PC3, and an interface IC5. The port PC1 may be a terminal configured to transmit a signal having the first type information. The port PC3 may be a terminal configured to transmit a signal having the third type information. The interface IC5 may be a terminal configured to transmit signals having the fifth type information.

The fourth IP block 110*d* may include a port PD2 and a port PD4. The port PD2 may be a terminal configured to transmit a signal having the second type information. The port PD4 may be a terminal configured to transmit a signal having the fourth type information.

In an embodiment, the system-on-chip automatic design device may synthesize first to fifth communication architectures 121 to 125 respectively corresponding to the first to fifth types of information, based on the modeling information of the first to fourth IP blocks 110*a* to 110*d*. In this case, the communication architecture may mean a circuit such as a wire, a bus, and a network-on-chip that connect IP blocks.

For example, the first communication architecture 121 may be a circuit connected to the ports PA1, PB1, and PC1 corresponding to the first type information. The second communication architecture 122 may be a circuit connected to the ports PA2 and PD2 corresponding to the second type information. The third communication architecture 123 may be a circuit connected to the ports PC3 and PB3 corresponding to the third type information. The fourth communication architecture 124 may be a circuit connected to the ports PB4 and PD4 corresponding to the fourth type information. The fifth communication architecture 125 may be a circuit connected to the interfaces IA5 and IC5 corresponding to the fifth type information.

In an embodiment, the IP blocks may be connected through the communication architecture. For example, the first and fourth IP blocks 110*a* and 110*d* may be connected through the second communication architecture 122. The first IP block 110*a* may output a signal having the second type information to the second communication architecture 122 through the port PA2. The fourth IP block 110*d* may receive a signal having the second type information from the second communication architecture 122 through the port PD2.

In an embodiment, the communication architecture may be a wire configured to transmit a clock signal. For example, the first IP block 110*a* may be an IP block including a clock generator. The first IP block 110*a* may output the clock signal through a wire through the port PA2. The fourth IP block 110*d* may receive the clock signal through the port PD2.

In an embodiment, the communication architecture may be a wire connecting a ground node. For example, the third communication architecture 123 may include the ground node. The port PC3 of the third IP block 110*c* and the port PB3 of the second IP block 110*b* may be connected to the ground node of the third communication architecture 123 through the wire. The ports PC3 and PB3 may receive a ground signal.

In an embodiment, the communication architecture may be a circuit configured to transmit data signals. For example, the first and third IP blocks 110*a* and 110*c* may be IP blocks that transmit and receive data. The fifth communication architecture 125 may be a network-on-chip based on an Advanced Peripheral Bus (APB) protocol or a network-on-chip based on an advanced extensible interface (AXI) protocol, which connects the first and third IP blocks 110*a* and 110*c*.

In an embodiment, a system-on-chip automatic design device may connect all signals used in the IP blocks included in the system-on-chip. For example, a system-on-chip automatic design device may include synthesizers corresponding to all signals used in the IP blocks. The system-on-chip automatic design device may synthesize the communication architectures that connect to each of all ports and all interfaces of the IP block through synthesizers. Accordingly, a system-on-chip automatic design device that automatically connects all IP blocks of the system-on-chip may be provided.

Figure 4A:
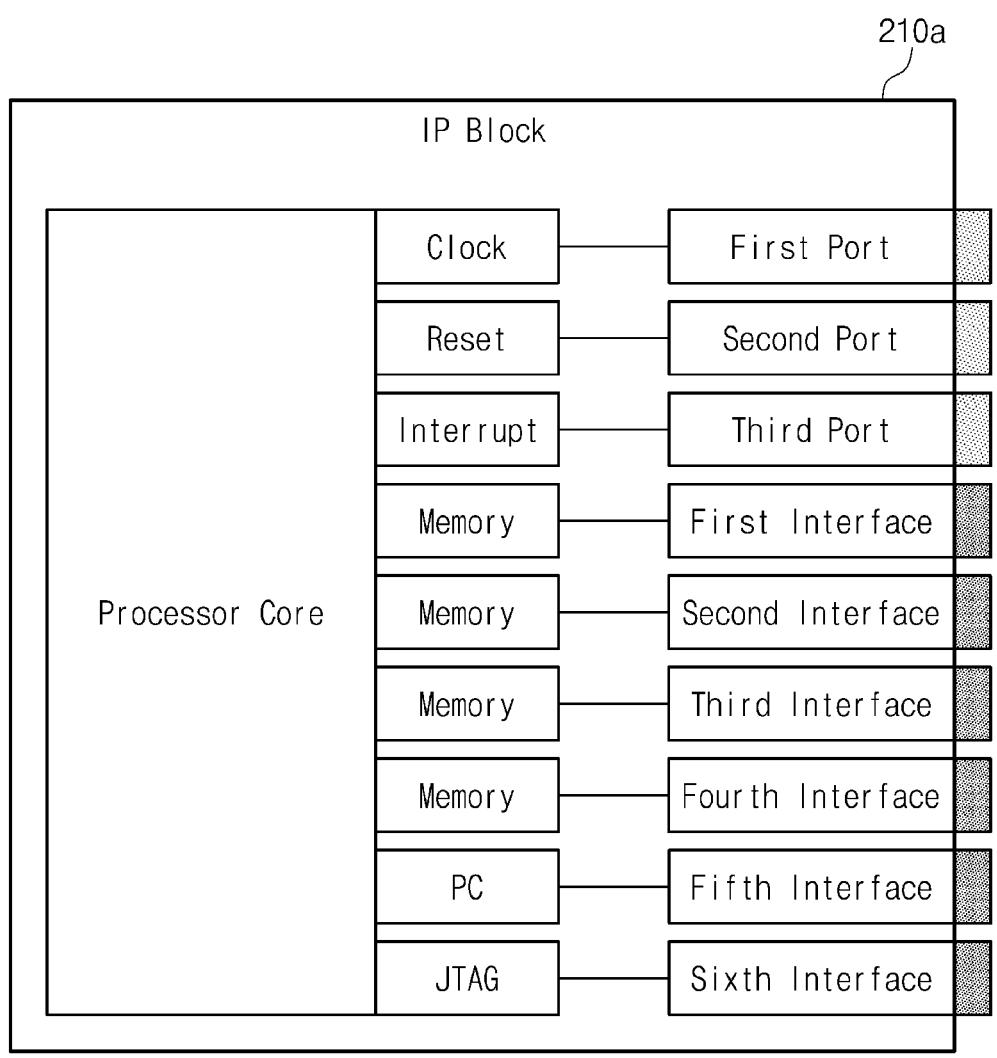
FIG. 4A is a diagram illustrating an IP block according to an embodiment of the present disclosure.

FIG. 4A is a diagram illustrating an IP block according to an embodiment of the present disclosure. Referring to FIG. 4A, an IP block 210*a* according to an embodiment of the present disclosure is illustrated by way of example. The IP block 210*a* may be a processor core including first to third ports and first to sixth interfaces.

For example, the first port may be a terminal that transmits a clock signal. The second port may be a terminal that transmits a reset signal. The third port may be a terminal that transmits an interrupt signal. The first to fourth interfaces are memory-type interfaces and may be terminals configured to transmit or receive data. The fifth interface may be a PC type interface. The sixth interface may be a JTAG type interface.

Figure 4B:
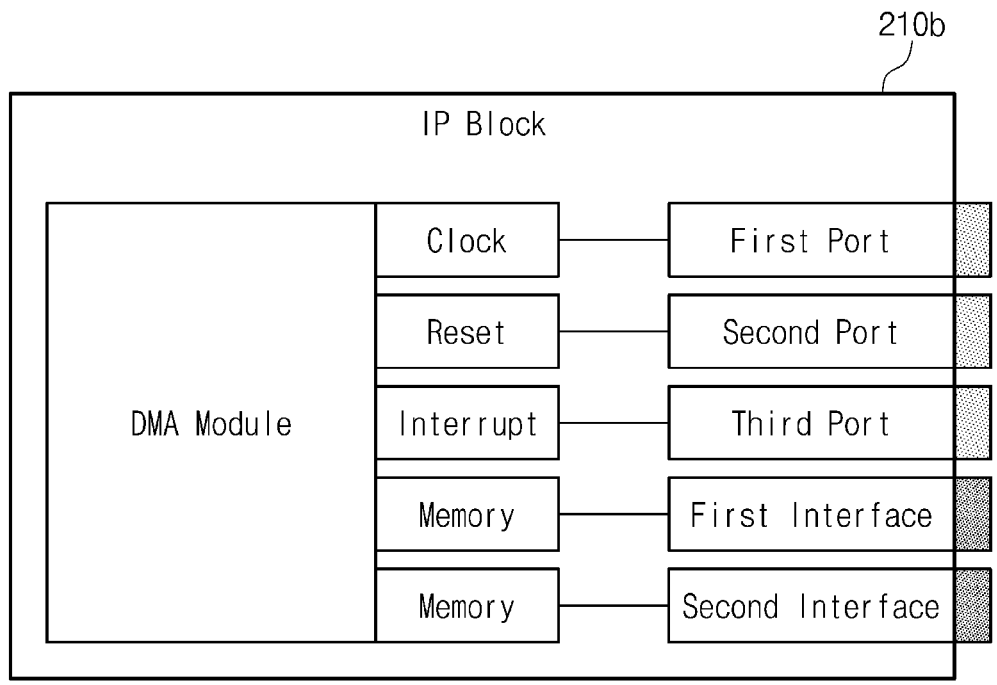
FIG. 4B is a diagram illustrating an IP block according to an embodiment of the present disclosure.

FIG. 4B is a diagram illustrating an IP block according to an embodiment of the present disclosure. Referring to FIG. 4B, an IP block 210*b* according to an embodiment of the present disclosure is illustrated by way of example. The IP block 210*b* may be a DMA module including first to third ports and first and second interfaces.

For example, the first port may be a terminal that transmits a clock signal. The second port may be a terminal that transmits a reset signal. The third port may be a terminal that transmits an interrupt signal. The first and second interfaces may be memory type interfaces.

Figure 4C:
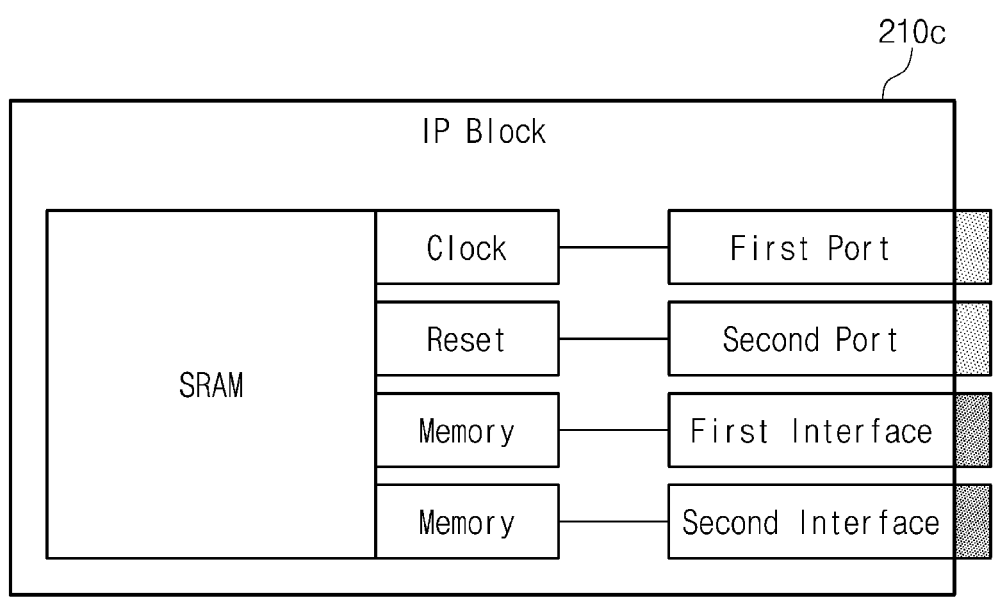
FIG. 4C is a diagram illustrating an IP block according to an embodiment of the present disclosure.

FIG. 4C is a diagram illustrating an IP block according to an embodiment of the present disclosure. Referring to FIG. 4C, an IP block 210*c* according to an embodiment of the present disclosure is illustrated by way of example. The IP block 210*c* may be an SRAM including first and second ports and first and second interfaces.

For example, the first port may be a terminal that transmits a clock signal. The second port may be a terminal that transmits a reset signal. The first and second interfaces may be memory type interfaces.

Figure 4D:
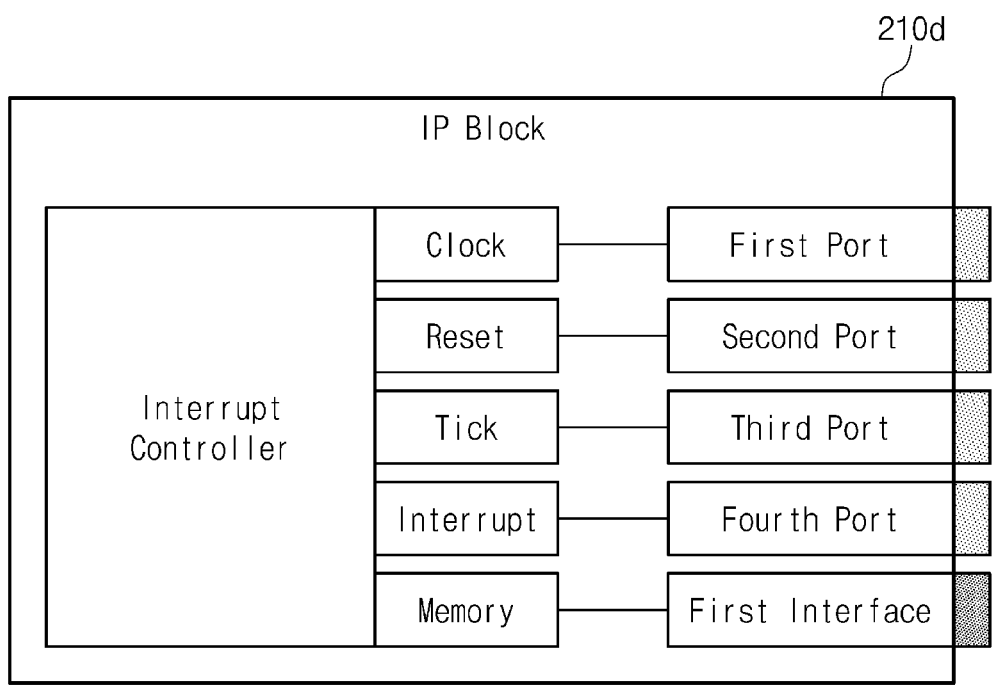
FIG. 4D is a diagram illustrating an IP block according to an embodiment of the present disclosure.

FIG. 4D is a diagram illustrating an IP block according to an embodiment of the present disclosure. Referring to FIG. 4D, an IP block 210*d* according to an embodiment of the present disclosure is illustrated by way of example. The IP block 210*d* may be an interrupt controller including first to fourth ports and a first interface.

For example, the first port may be a terminal that transmits a clock signal. The second port may be a terminal that transmits a reset signal. The third port may be a terminal that transmits a tick signal. The fourth port may be a terminal that transmits an interrupt signal. The first interface may be a memory type interface.

Figure 4E:
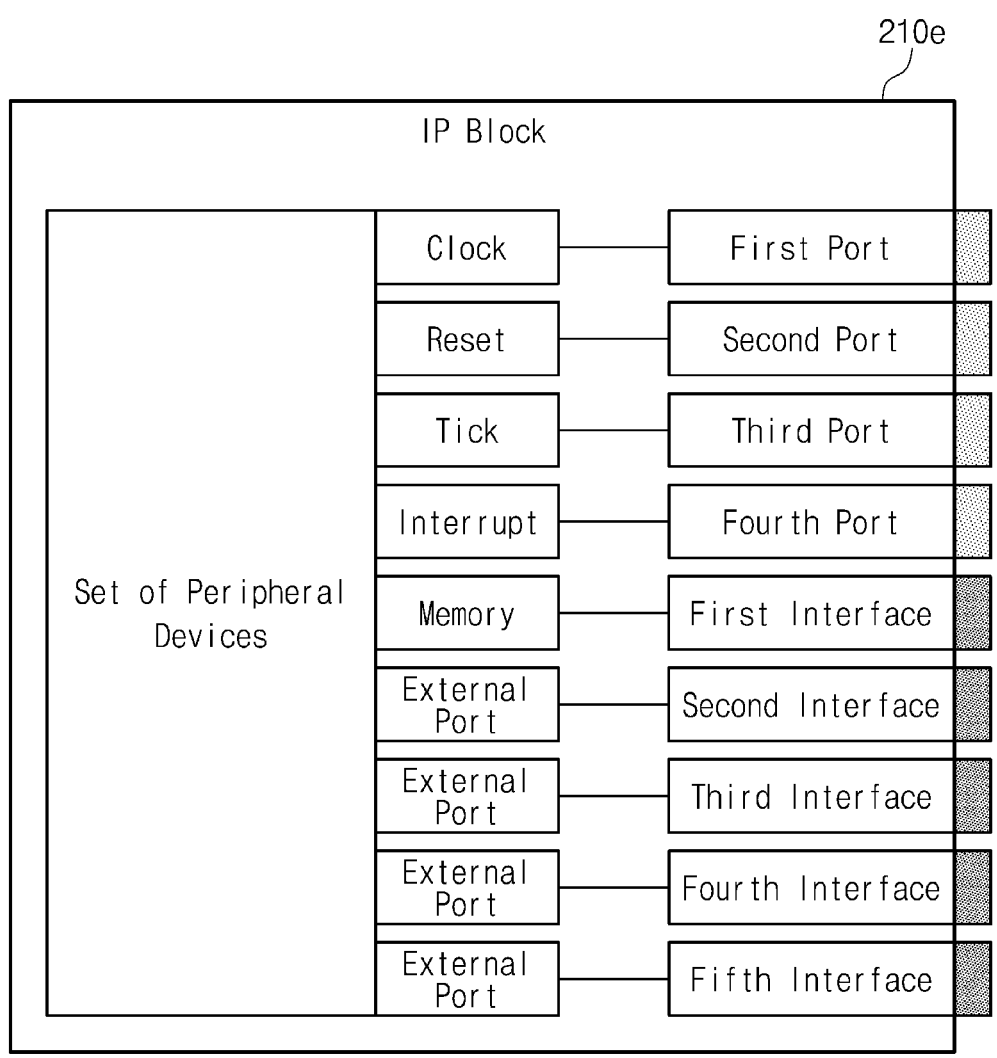
FIG. 4E is a diagram illustrating an IP block according to an embodiment of the present disclosure.

FIG. 4E is a diagram illustrating an IP block according to an embodiment of the present disclosure. Referring to FIG. 4E, an IP block 210*e* according to an embodiment of the present disclosure is illustrated by way of example. The IP block 210*e* may be a set of peripheral devices including first to fourth ports and first to fifth interfaces.

For example, the first port may be a terminal that transmits a clock signal. The second port may be a terminal that transmits a reset signal. The third port may be a terminal that transmits a tick signal. The fourth port may be a terminal that transmits an interrupt signal. The first interface may be a memory type interface. The second to fifth interfaces may be terminals connected to other devices, and may be external port type interfaces.

Figure 5:
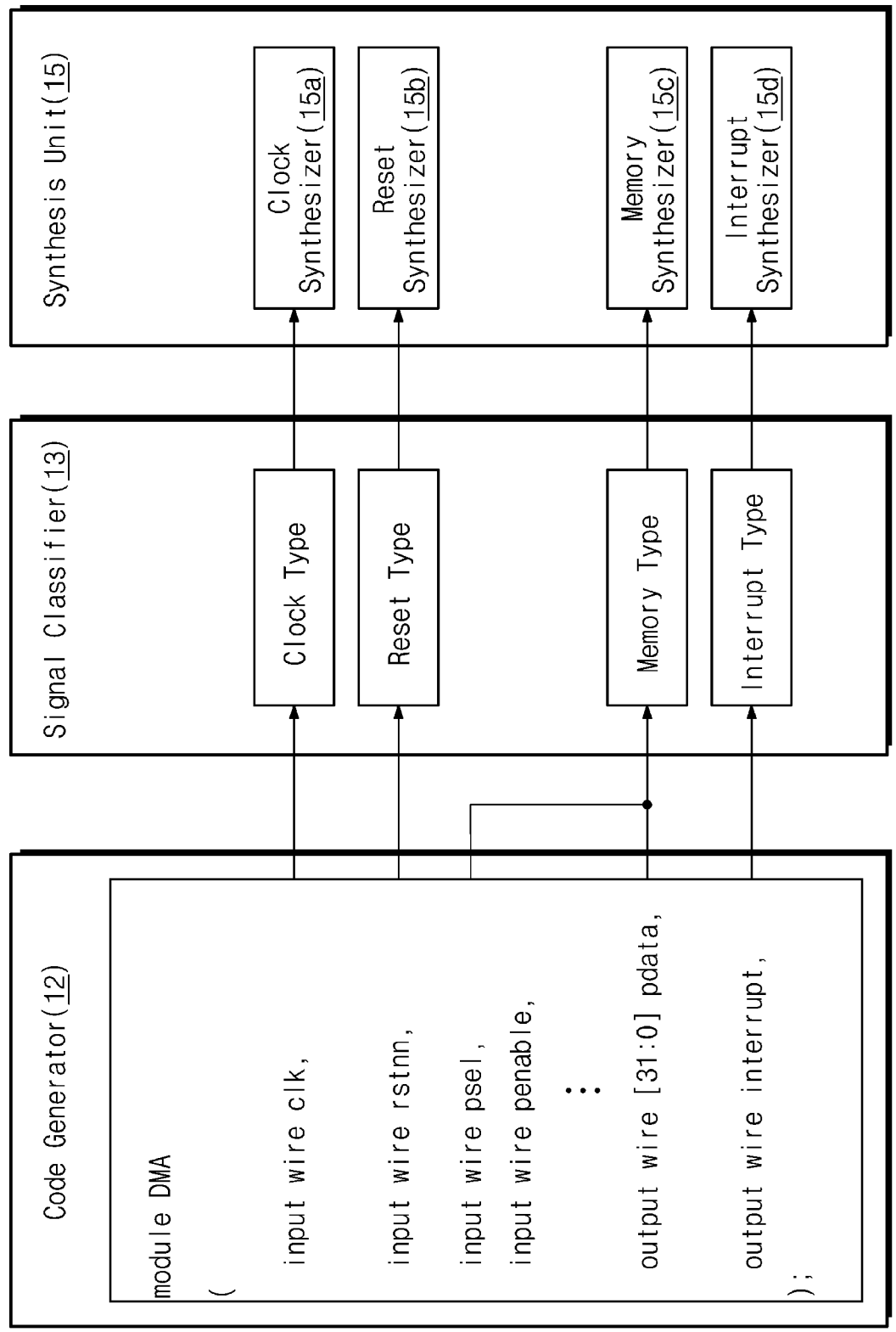
FIG. 5 is a diagram describing an operation of a system-on-chip automatic design device of FIG. 1.

FIG. 5 is a diagram describing an operation of a system-on-chip automatic design device of FIG. 1. Referring to FIGS. 1 and 5, the operation of the system-on-chip automatic design device 10 is described. The system-on-chip automatic design device 10 may include the code generator 12, the signal classifier 13, and the synthesis unit 15.

The code generator 12 may create codes describing a connection relationship among the IP blocks 110. The code generated by the code generator 12 may include information on signals used in the IP block 110. For example, the code generator 12 may generate an RTL code describing the connection relationship of the IP block 110 which is a DMA module. The generated RTL code may include information corresponding to a clock signal, a reset signal, a memory type data signal, and an interrupt signal.

The signal classifier 13 may classify the codes generated by the code generator 12. In more detail, the signal classifier 13 may classify the codes into signal codes, based on the type information. For example, when the code generator 12 generates an RTL code describing the connection relationship of the DMA module, the signal classifier 13 may classify the generated RTL code into a clock signal code of a clock type, a reset signal code of a reset type, a data signal code of a memory type, and an interrupt signal code of an interrupt type.

The synthesis unit 15 may receive signal codes classified by the signal classifier 13. The synthesis unit 15 may include a plurality of synthesizers 15*a* to 15*d* having the type information. The synthesis unit 15 may synthesize the signals through a synthesizer having the type information corresponding to each of the signal codes.

For example, the signal classifier 13 may classify signal codes of a clock type, a reset type, a memory type, and an interrupt type. The synthesis unit 15 may include the synthesizers 15*a* to 15*d* each having the clock type, the reset type, the memory type, and the interrupt type.

In this case, the clock synthesizer 15*a* may synthesize a circuit that transmits a clock signal, based on a signal code classified as the clock type. The reset synthesizer 15*b* may synthesize a circuit that transmits a reset signal, based on a signal code classified as the reset type. The memory synthesizer 15*c* may synthesize a circuit that transmits data signals, based on signal codes classified as the memory type. The interrupt synthesizer 15*d* may synthesize a circuit that transmits an interrupt signal, based on a signal code classified as the interrupt type.

In an embodiment, the synthesis unit 15 may include synthesizers corresponding to each of all type information included in the codes generated by the code generator 12. The system-on-chip automatic design device 10 that automatically designs the system-on-chip 100 may be provided by synthesizing circuits connected to all ports and all interfaces of the IP blocks 110 through the synthesis unit 15.

Figure 6:
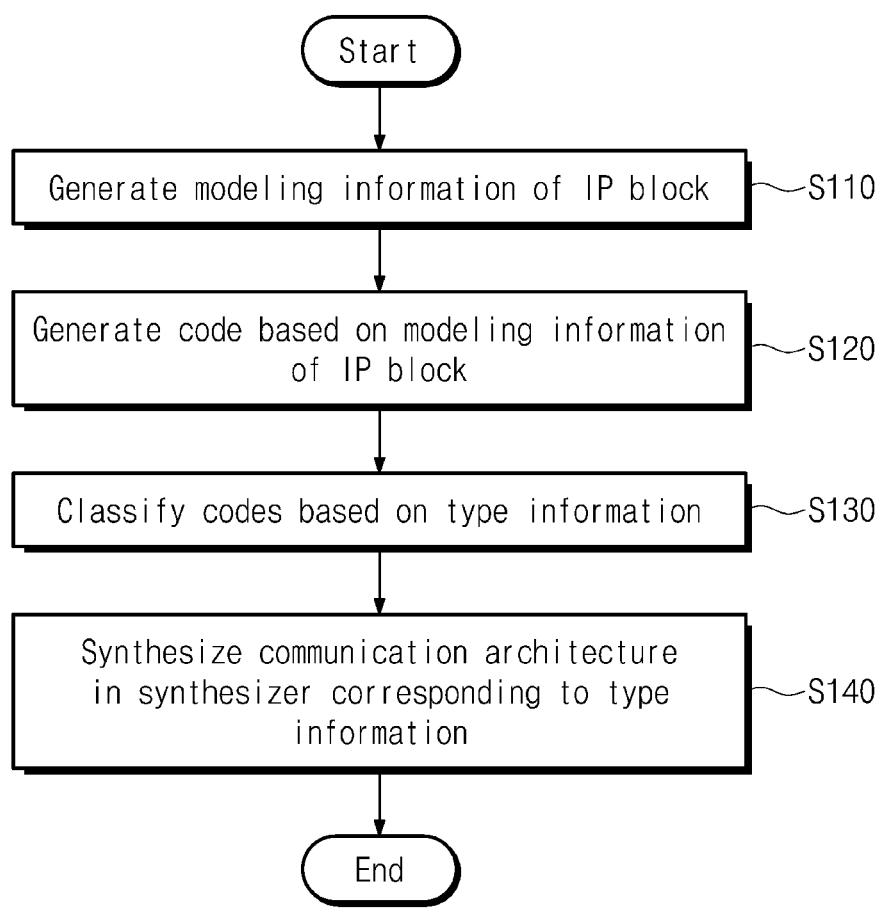
FIG. 6 is a diagram illustrating a method of operating a system-on-chip automatic design device according to an embodiment of the present disclosure.

FIG. 6 is a diagram illustrating a method of operating a system-on-chip automatic design device according to an embodiment of the present disclosure. Referring to FIG. 6, a method of operating a system-on-chip automatic design device is illustrated as an example.

In operation S110, the system-on-chip automatic design device may generate modeling information of an IP block. The modeling information of the IP block may include port information and interface information corresponding to all signals used in the IP block. For example, when the IP block is a module that communicates with first and second signals, the IP modeling information includes information on a first port outputting the first signal, information on a second port outputting the second signal, first type information corresponding to the first signal, and second type information corresponding to the second signal.

In operation S120, the system-on-chip automatic design device may generate a code, based on the modeling information of the IP block. For example, the system-on-chip automatic design device may generate an RTL code including information on all signals used in the IP block, based on the modeling information generated in operation S110. The generated RTL code may include signal codes corresponding to each of the signals.

In operation S130, the system-on-chip automatic design device may classify codes, based on type information. For example, the system-on-chip automatic design device may classify a first signal code corresponding to the first signal having first type information and a second signal code corresponding to the second signal having second type information from the RTL code generated in operation S120.

In operation S140, the system-on-chip automatic design device may synthesize a communication architecture in a synthesizer corresponding to the type information. For example, when the first signal code and the second signal code are classified in operation S130, the system-on-chip automatic design device may synthesize a first communication architecture that transmits the first signal through a first synthesizer corresponding to first type information. In addition, the system-on-chip automatic design device may synthesize a second communication architecture that transmits the second signal through a second synthesizer corresponding to second type information. In this case, the first and second synthesizers may be included in the system-on-chip automatic design device.

As described above, according to an embodiment of the present disclosure, by generating the code, based on the modeling information of the IP block, classifying signal codes, based on the type information from the generated code, and synthesizing the communication architectures in each of the synthesizers corresponding to the type information, based on the classified signal codes, a method of operating a system-on-chip automatic design device may be provided in which all ports and interfaces of an IP block are automatically connected.

Figure 7:
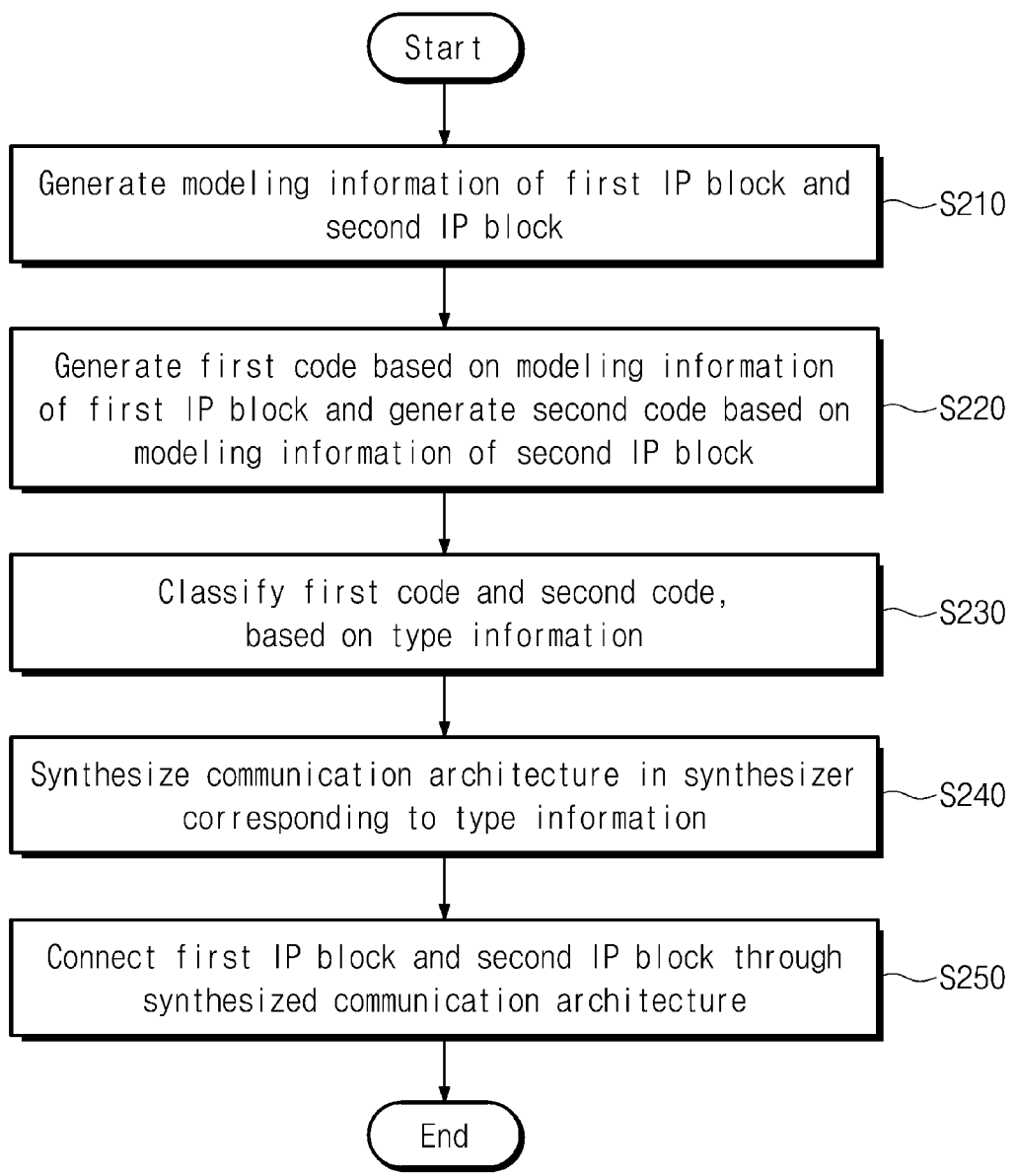
FIG. 7 is a diagram illustrating a method of operating a system-on-chip automatic design device according to an embodiment of the present disclosure.

FIG. 7 is a diagram illustrating a method of operating a system-on-chip automatic design device according to an embodiment of the present disclosure. Referring to FIG. 7, an operation method of a system-on-chip automatic design device for automatically designing a system-on-chip to which IP blocks are connected is illustrated as an example.

In operation S210, the system-on-chip automatic design device may generate modeling information of the first IP block and modeling information of the second IP block. For example, the modeling information of the first IP block may include information indicating that a first signal having first type information and a second signal having second type information are used in the first IP block. The modeling information of the second IP block may include information indicating that a third signal having the first type information and a fourth signal having third type information are used in the second IP block.

In operation S220, the system-on-chip automatic design device may generate a first code, based on the modeling information of the first IP block. In addition, the system-on-chip automatic design device may generate a second code, based on modeling information of the second IP block. For example, the system-on-chip automatic design device may generate a first code including information of all signals used in the first IP block and a second code including information of all signals used in the second IP block, based on the modeling information generated in operation S210.

In operation S230, the system-on-chip automatic design device may classify the first code, based on the type information. In addition, the system-on-chip automatic design device may classify the second code, based on the type information. In operation S240, the system-on-chip automatic design device may synthesize a communication architecture in a synthesizer corresponding to the type information.

For example, the system-on-chip automatic design device may classify a first signal code corresponding to the first signal having the first type information and a second signal code corresponding to the second signal having the second type information from the first code generated in operation S220. In addition, the system-on-chip automatic design device may classify a third signal code corresponding to the third signal having the first type information and a fourth signal code corresponding to the fourth signal having the third type information from the second code generated in operation S220.

Thereafter, the system-on-chip automatic design device may synthesize a first communication architecture that transmits first and third signals through a first synthesizer corresponding to the first type information. The system-on-chip automatic design device may synthesize a second communication architecture that transmits a second signal through a second synthesizer corresponding to the second type information. The system-on-chip automatic design device may synthesize a third communication architecture that transmits a fourth signal through a third synthesizer corresponding to the third type of information. In this case, the first to third synthesizers may be included in the system-on-chip automatic design device.

In operation S250, the system-on-chip automatic design device may connect the IP blocks through the synthesized communication architecture. For example, when the first communication architecture that transmits the first signal to the first IP block and transmits the third signal to the second IP block is synthesized in operation S240, the system-on-chip automatic design device may connect the first IP block and the second IP block through the first communication architecture.

As described above, according to an embodiment of the present disclosure, by generating codes, based on the modeling information of a plurality of IP blocks, classifying each of the generated codes into signal codes, based on the type information, and synthesizing a communication architecture that transmits signals having the same type information, based on signal codes having the same type information, a method of operating a system-on-chip automatic design device may be provided in which a connection between a plurality of IP blocks is automatically implemented.

According to an embodiment of the present disclosure, a system-on-chip automatic design device and a method of operating the same are provided in which a connection between IPs is automatically implemented.

In addition, according to an embodiment of the present disclosure, a system-on-chip automatic design device and a method of operating the same are provided in which system-on-chip design errors are reduced, a system-on-chip design speed is improved, and a burden of system-on-chip redesign due to an addition, deletion, or change of an IP is reduced.

The contents described above are specific embodiments for implementing the present disclosure. The present disclosure may include not only the embodiments described above but also embodiments in which a design is simply or easily capable of being changed. In addition, the present disclosure may also include technologies easily changed to be implemented using embodiments. Therefore, the scope of the present disclosure is not limited to the described embodiments but should be defined by the claims and their equivalents.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a system-on-chip automatic design device including a first synthesizer and a second synthesizer, the method comprising:
    generating a first code, based on information of a first signal and information of a second signal that are used in a first IP (Intellectual Property) block;
    classifying a first signal code corresponding to the first signal and a second signal code corresponding to the second signal from the first code;
    synthesizing, through the first synthesizer, a first communication architecture configured to transmit the first signal based on the classified first signal code; and
    synthesizing, through the second synthesizer, a second communication architecture configured to transmit the second signal based on the classified second signal code.

2. The method of claim 1, wherein the information of the first signal includes first type information, and the information of the second signal includes second type information, and
    wherein the classifying of the first signal code and the second signal code from the first code includes classifying the first signal code from the first code, based on the first type information, and classifying the second signal code from the first code, based on the second type information.

3. The method of claim 2, wherein the generating of the first code includes generating the first code, based on the information of the first signal, the information of the second signal, and information of a third signal that are used in the first IP block,
    wherein the classifying of the first signal code and the second signal code from the first code includes classifying the first signal code and a third signal code corresponding to the third signal from the first code, based on the first type information, and
    wherein the information of the third signal includes the first type information.

4. The method of claim 3, further comprising:
    synthesizing a third communication architecture configured to transmit the third signal, based on the classified third signal code through the first synthesizer.

5. The method of claim 2, further comprising:
    generating a second code, based on information of a fourth signal that is used in a second IP block; and
    classifying a fourth signal code corresponding to the fourth signal from the second code, and
    wherein the information of the fourth signal includes the first type information.

6. The method of claim 5, wherein the synthesizing of the first communication architecture includes synthesizing the first communication architecture configured to transmit the first signal, based on the classified first signal code and to transmit the fourth signal, based on the classified fourth signal code through the first synthesizer.

7. The method of claim 6, further comprising:
    connecting the first IP block and the second IP block through the synthesized first communication architecture.

8. The method of claim 6, wherein the first type information includes clock information, wherein the first signal is a clock transmission signal, and wherein the fourth signal is a clock reception signal.

9. The method of claim 6, wherein the first type information includes data transmission/reception information, and wherein the first communication architecture is a network-on-chip, based on an advanced extensible interface (AXI) protocol.

10. A system-on-chip design device comprising:
    an IP library configured to store information of a first signal and information of a second signal that are used in a first IP (Intellectual Property) block;
    a code generator configured to generate a first code, based on the information of the first signal and the information of the second signal stored in the IP library;
    a signal classifier configured to classify a first signal code corresponding to the first signal and a second signal code corresponding to the second signal from the first code;
    a first synthesizer configured to synthesize a first communication architecture that transmits the first signal, based on the classified first signal code; and
    a second synthesizer configured to synthesize a second communication architecture that transmits the second signal, based on the classified second signal code.

11. The system-on-chip design device of claim 10, wherein the signal classifier is further configured to classify the first signal code from the first code, based on first type information and to classify the second signal code from the first code, based on second type information, and
    wherein the information of the first signal includes the first type information, and wherein the information of the second signal includes the second type information.

12. The system-on-chip design device of claim 11, wherein the IP library is further configured to store information of a third signal that is used in a second IP block and includes the first type information,
    wherein the code generator is further configured to generate a second code, based on the information of the third signal stored in the IP library,
    wherein the signal classifier is further configured to classify a third signal code corresponding to the third signal from the second code, and
    wherein the first synthesizer is further configured to synthesize the first communication architecture that transmits the first signal, based on the classified first signal code and transmits the third signal, based on the classified third signal code.

\* \* \* \* \*